United States Patent [19]

Thaler et al.

[11] Patent Number: 4,667,654

[45] Date of Patent: May 26, 1987

[54] PULSE COMBUSTION PROCESS FOR THE PREPARATION OF PREGELATINIZED STARCHES

[75] Inventors: Martin D. Thaler; Roger W. Rubens, both of Somerville, N.J.

[73] Assignee: National Starch and Chemical Corporation, Bridgewater, N.J.

[21] Appl. No.: 753,516

[22] Filed: Jul. 10, 1985

[51] Int. Cl.$^4$ .............................................. F24B 3/00
[52] U.S. Cl. ...................................................... 127/65
[58] Field of Search ...................... 127/65, 68, 32, 71, 127/69, 28, 33, 67

[56] References Cited

U.S. PATENT DOCUMENTS

| | | | |
|---|---|---|---|
| 3,137,592 | 6/1964 | Protzman et al. | 127/32 |
| 3,200,012 | 8/1965 | Hay | 127/69 |
| 3,374,096 | 3/1968 | Knoch | 127/71 |
| 3,374,115 | 3/1968 | Frank et al. | 127/71 |
| 3,462,955 | 8/1969 | Lockwood et al. | 60/249 |
| 3,485,487 | 12/1969 | Bennett et al. | 266/20 |
| 3,586,515 | 6/1971 | Anderson | 99/289 |
| 3,607,394 | 9/1971 | Germino et al. | 127/69 |
| 4,155,884 | 5/1979 | Hughes | 127/71 |
| 4,226,668 | 10/1980 | Ferguson | 159/4 A |
| 4,256,771 | 3/1981 | Henderson et al. | 127/71 |
| 4,280,851 | 7/1982 | Pitchon et al. | 127/32 |
| 4,303,451 | 12/1981 | Seidel et al. | 127/71 |
| 4,334,366 | 6/1982 | Lockwood | 34/17 |

OTHER PUBLICATIONS

"Pulse Combustion Lowers Drying Costs", Chemical Engineering, 12/10/84, pp. 44–45.
Sonodyne Industries Dehydration System, Tech. Brochure, 2/81-1002.

*Primary Examiner*—R. B. Penland
*Attorney, Agent, or Firm*—Margaret B. Kelley; Edwin M. Szala

[57] ABSTRACT

A process for simultaneously atomizing, cooking, and drying a mixture of starch and water in the exhaust gas stream from a sonic pulse jet combustion engine is described. The process consists of preparing a mixture of a granular starch with water (preferably a starch cake), feeding the mixture into the exhaust pipe of the jet combustion engine, maintaining the resulting mixture of atomized starch, water, and hot gas in the exhaust pipe for a time sufficient to gelatinize and substantially dry the atomized starch, and recovering the pregelatinized starch powder by exhausting the mixture into a collection chamber supplied with a flow of air.

9 Claims, 2 Drawing Figures

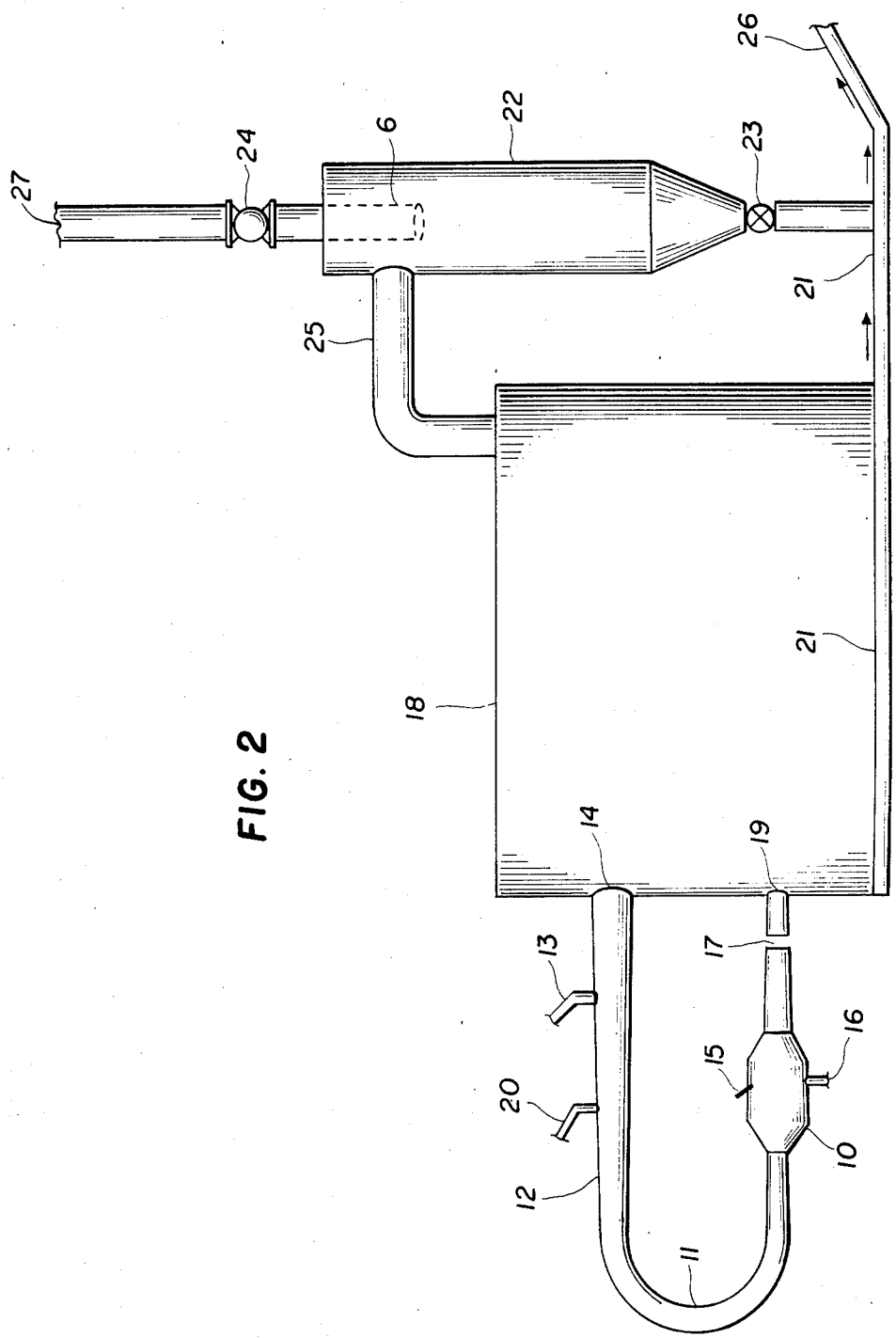

PULSE COMBUSTION PROCESS FOR THE PREPARATION OF PREGELATINIZED STARCHES

BACKGROUND OF THE INVENTION

The present invention relates to a process for simultaneously pregelatinizing and drying granular starches and to the pregelatinized starches produced thereby. More particularly it relates to the use of the hot exhaust gases and sonic energy from pulse jet combustion engines to carry out the simultaneous pregelatinizing and drying.

Cold-water-dispersible starches, often referred to as pregelatinized starches, are typically prepared by thermal, chemical, or mechanical gelatinization. The term "gelatinized" or "cooked" starch refers to swollen starch granules which have lost their polarization crosses and which may or may not have lost their granular structure. The thermal processes generally used to prepare such starches include drum-drying, extrusion, and spray-drying. Each of these processes suffer from one or more disadvantages.

Drum-drying involves simultaneously cooking and drying a very high viscosity, semi-solid starch paste on heated drums. The dried sheets are scraped off the drum with a metal knife and then ground. This process can be conveniently carried out at a high starch solids content (typically maximum of about 43%). Despite the fact that it suffers from several product disadvantages and frequent maintenance problems, it is still the most widely used commercial process.

Drum-dried products are subjected to severe mechanical shear on the drum and, as a result, show an initially high viscosity (because of the extensive granular destruction) but then "breakdown" to much lower viscosities with continued shear and/or heating. It is also difficult to maintain high levels of product cleanliness. Some metal contamination during removal of the sheet can occur. Further, the drum system is "open" so that the paste adhering to any part of the equipment (e.g., rolls, dams, scrapers, and/or knife holders) can dry out, darken, and flake into the final product.

Operating costs are very high because of the high torque required to rotate multiple rolls containing the semi-solid starch paste for application to the heated drums. End dams, which are used to prevent leakage of the starch paste from the end of the cylinder, are also high maintenance devices, as are the knives which must be maintained sharp and true (with respect to the mechanical alignment to the drum) to facilitate sheet removal at each drum rotation. Knife failures lead to "double coating" which reduces heat transfer in those areas.

Extrusion may also be used to simultaneously cook and dry starches (see U.S. Pat. No. 3,137,592 issued June 16, 1964 to T. F. Protzman et al.). This method involves the physical working of a starch-water mixture at elevated temperatures and pressures, causing the gelatinization of the starch, followed by expansion after exiting the die for flashing off the water. The temperature and pressure are generated by mechanical shear between the rotating screw (auger) and cylindrical housing (barrel) of the extruder. The extrudate is then ground. It suffers from the disadvantage that one cannot conveniently prepare a high viscosity starch product.

When the moisture of the starch feed is low (i.e., about 20%), a low moisture, expanded, easily ground product is obtained which does not require further drying. However, disruption of the starch granules is so extensive that the product cannot provide the high viscosities needed for most food applications. With high moisture feeds (i.e., 40–50%), the shear forces are significantly reduced and starches with much higher viscosities are produced. However, the extrudate is then moist, soft textured, and must subsequently be dried in a separate drying process.

Pregelatinized starches can also be prepared by spray-drying. In the typical process, an aqueous slurry of the starch is precooked prior to atomization into a large chamber carrying a stream of hot air. The atomization (i.e., breaking the feed into very fine particles) is accomplished with high pressure single-fluid nozzles, with two-fluid nozzles in which compressed air or steam is the atomizing medium, or with a rapidly rotating centrifugal disc.

The use of conventional atomizers presents no problem when an uncooked starch slurry is used. However, when the starch is in a gelatinized (cooked) state, spray-drying the resultant paste becomes more difficult and complex due to the increased viscosity. For example, a dispersion with 7% solids of gelatinized corn starch has a viscosity of about 500 centipoises (cps.), whereas a dispersion with similar amounts of ungelatinized corn starch has a viscosity similar to that of water, i.e., about 1 cps. Not only are gelatinized starch pastes difficult to pump and atomize due to their high viscosities, but the swollen starch granules are subjected to substantial shearing action which destroys the granule's integrity. Hence, native unconverted starches, with or without derivatization, must be processed at low solids. These so-called "thick-cooking starches" must be precooked at about 5–8% solids so that the paste is low enough in viscosity to permit atomization. The use of such a low solids paste is rarely justifiable on an economic basis.

Due to these problems spray-drying is usually limited to "thin-cooking starches", i.e., converted starches where the polymeric structure has been severely degraded by acid hydrolysis, oxidation, and/or dextrinization. Converted starches can be used at higher solids because their pastes are lower in viscosity and can be atomized. However, their viscosity is low only relative to the native unconverted starches. Even a granular acid-converted starch, which shows an extensive viscosity reduction due to degradation, must be processed at less than 30% solids.

Further, a spray-dryer is not an efficient heat transfer device with respect to providing the energy needed for evaporation of water. The equipment tends to be massive in size, e.g., 4.6–7.3 m. (15–24 ft.) in diameter by 6.1–12.2 m. (20–40 ft.) in height. Convective and radiant heat losses and leakage of ambient air are exaggerated by the large surface areas. Also, large volumes of discharged air (e.g., 566–1133 m.$^3$ or 20,000–40,000 ft.$^3$ per min.) at exit temperatures of 82°–107° C. (180°–225° F.) carry a large portion of input energy. The heat efficiency is probably only about 50–55%.

The improved spray-drying method disclosed in U.S. Pat. No. 4,280,851 (issued July 28, 1982 to E. Pitchon et al.) overcomes the solids/viscosity limitation of the precooked starch feed by introducing an aqueous slurry of a granular starch to a set of atomizing orifices. The atomized slurry then contacts high pressure steam in an outer chamber of the same nozzle which has dual atomizing chambers. The steam serves to cook the starch, apparently while the starch is in an atomized state, and provides energy for atomizing the water/starch/ steam mixture through the orifice of the outer chamber. Notwithstanding the advantages of using an uncooked starch slurry, this process suffers from many of the disadvantages of conventional spray-drying. The proportion of heating medium (e.g., steam) to liquified material (an aqueous slurry at about 40% starch solids) is about 0.5–3.0:1. Test experience indicates a ratio of at least 1.25–1.50:1 is needed for good gelatinization to a high viscosity product. At a ratio of 1.5, a 40% solids feed is diluted to about 16% solids which approaches the feed solids of a precooked starch paste. Steam consumption would probably be high (perhaps 100 hp/1000 lb. starch/hr.), and the dryer hot air stream would have to be at a relatively high rate to maintain an acceptable humidity. Thus, the inherent low efficiency of spray-drying, described above, is still working to negate many of the advantages of this process.

Hence, there is still a need for an efficient and versatile process for preparing cold water dispersible (i.e., pregelatinized) starches.

SUMMARY OF THE INVENTION

The present invention provides a process for simultaneously atomizing, cooking, and drying a mixture of starch and water to produce a pregelatinized starch powder, which comprises the steps of:

(a) preparing a mixture of a granular starch with water;

(b) feeding the mixture into an exhaust pipe containing a hot exhaust gas stream from a sonic pulse jet combustion engine to atomize the starch mixture;

(c) maintaining the resulting mixture of atomized starch, water, and hot gas in the exhaust pipe for a time sufficient to pregelatinize and substantially dry the atomized starch; and (d) recovering the pregelatinized starch powder by exhausting the mixture containing the atomized, pregelatinized, and substantially dry starch powder into a collection chamber supplied with a flow of air. Drying is completed in the chamber with the energy supplied by the sonic pulse jet engine. The air flow is typically supplied by a fan and the starch powder is separated in bag collectors in a spray-dryer.

The feed stream may be a moist granular starch cake formed by spraying the starch with sufficient water to moisten the granules or an aqueous slurry formed by slurrying the granular starch in water. The size and shape of the pipe containing the exhaust gas stream, rate of addition and point of entry into the pipe of the starch feed stream, and heat of the exhaust gas stream from the sonic pulse jet combustion engine are used to adjust the cooking time and temperature, moisture content of the starch, and starch residence time to insure that the starch is pregelatinized and dried. Additionally, a stream of cooling water can be injected into the pipe carrying the hot gases before the addition of the starch mixture. The temperature control provided by this water is indicated by thermocouples mounted in the chamber before and after the addition of the starch.

The present invention thus provides an efficient process for simultaneously dispersing, pregelatinizing, and drying a granular starch feed which utilizes both the high temperature of the exhaust gas stream (>1371° C.->2500° F.) and the sonic energy produced by the pulse jet engine. The cyclical nature of the combustion (low pressure fuel is cut-off at each "explosion" and started again as the pressure is dissipated) develops a sonic wave front which disperses the starch, maximizes the surface area, and improves the efficiency of heat transfer. The process is thus energy efficient and, in addition, the production rate is high. In contrast with drum-dried and extruded starches, the resultant cooked starches are still substantially granular in nature. The absence of polarization crosses indicates that the granular crystallinity accounting for water insolubility has been removed. The starches are readily dispersed without lumping because the granule has not been destroyed, and the resulting smooth pastes have acceptable viscosity characteristics.

A further advantage of this process is its versatility, namely the fact that it can be used not only with conventional starch slurries (30–40% solids), as in drum drying, but also with moistened starch granules (cakes at 55–70% solids) as in extruders. It thus has the advantages of the prior art simultaneous processes without the disadvantages, i.e., relatively low process solids, high mechanical shearing forces, high maintenance, and poor thermal efficiency.

BRIEF DESCRIPTION OF THE DRAWINGS

The device used to provide the thermal drive, feed turbulence and particle atomization for starch gelatinization and drying is a valveless, pulse jet engine. It is described in U.S. Pat. No. 3,462,955 (issued Aug. 26, 1969) to R. M. Lockwood and E. L. Bennett.

The pulse jet engine is essentially an elongated hollow tube open at its ends and turned up on itself into a "U" shaped configuration. The sketch in FIG. 1 is a simple representation of the major components of the engine. A combustion chamber 10 is located along one "leg" of the "U" and is equipped with a sparking device 15 and at least one fuel nozzle 16. Air is admitted to the combustion chamber 10 through an inlet nozzle 17 which is separated by a few inches from an air augmenter 19. Either liquid or gaseous fuel is delivered to the combustion chamber 10 through the fuel nozzle 16. An elbow 11, an exhaust pipe 12, a feed injection nozzle 13, and a diffuser 14 comprise the remaining sections of the "U", with the open ends of the tube facing in the same direction and exhausting into a collection chamber 18.

The air and fuel are drawn into the combustion chamber 10 through the air and fuel inlet nozzles 17 and 16, respectively, and ignited by the sparking device 15. Hot exhaust gases from the detonation move to the right past the air inlet nozzle 17 and the air augumenter 19, and left through the elbow 11, the exhaust pipe 12, past the feed injection nozzle 13, and through the diffuser 14. About 70% of the stream passes the feed inlet nozzle 13. Both streams exhaust into the collection chamber 18. Once the operation of the engine is initiated, the sparking device 15 can be de-energized because the engine will continue to operate as a result of the high temperatures attained in the combustion chamber 10.

Rapid expansion of gases in the combustion chamber 10 after ignition cause the pressure to rise, momentarily shutting off the fuel supply at fuel nozzle 16 which is maintained at low pressure. After the outward discharge of gases through the diffuser 14 and the air augmenter 19, chamber pressure falls and fuel is again admitted through fuel nozzle 16. Discharge of gases and dissipation of chamber pressure also causes a reverse or inward flow of ambient air through air inlet nozzle 17 into the combustion chamber 10. The admixture of fuel and air is again detonated by the hot walls of the combustion chamber 10, which can reach 1371° C. (2500° F.). Thus, the operation is repeated, providing cyclically repetitive ignition of the fuel/air charges intermittenly introduced into the combustion chamber 10. The rate of detonations or pulsation depends on the size and geometry of the engine and is usually designed for about 250 cycles per second. This frequency results in a sonic wave front which provides the mixing, turbulence, and atomization of feed particles introduced into the hot gases through feed injection nozzle 13. The acoustic energy assists in good dispersion of feed particles, vibrates the particles to rapidly strip boundary layers of water, and provides the system with excellent heat transfer. The combination of high thermal drive and sonic activity results in rapid gelatinization and simultaneous drying of the starch and water mixture introduced through injection nozzle 13.

FIG. 2 illustrates the over-all processing system. The pulse jet engine described above is at the left side of the drawing and shows the combustion chamber 10, the elbow 11, the exhaust pipe 12, the diffuser 14, the air augmenter 19, and the feed injection nozzle 13. If desired, a method for spraying water into the hot exhaust gases may be provided by a nozzle 20. Both ends, 14 and 19, of the "U" shaped engine discharge into the collection chamber 18. A complete air evacuation system, much as a conventional spray dryer, is provided by an exhaust fan 24, a bag collector 22, a rotating air-lock valve 23, and a chamber discharge pipe 25. The engine exhaust gases, together with air entering openings around the diffuser 14 and the augmenter 19 (not sealed), are drawn through the collection chamber 18 and out the chamber discharge pipe 25 with energy from the exhaust fan 24.

A bag collector 22 separates moist air from product particulates by a fabric which permits only vapors passing through the fabric to be exhausted through a stack 27 to the atmosphere. Particles blocked by the fabric are "shaken" or "pulsed" down the bag collector 22 through the rotating air-lock 23 to a conveyor 21. The conveyor 21 extends the length of the collection chamber 18 so that particles too large or too dense to be carried by the air stream can be mechanically withdrawn. The conveyor 21 combines, on a continuous basis, particles settling in the chamber with fines separated by the bag collector 22, through the rotating airlock 23, and delivers this product stream to a packer 26.

DESCRIPTION OF THE PREFERRED EMBODIMENTS

Figure 1:
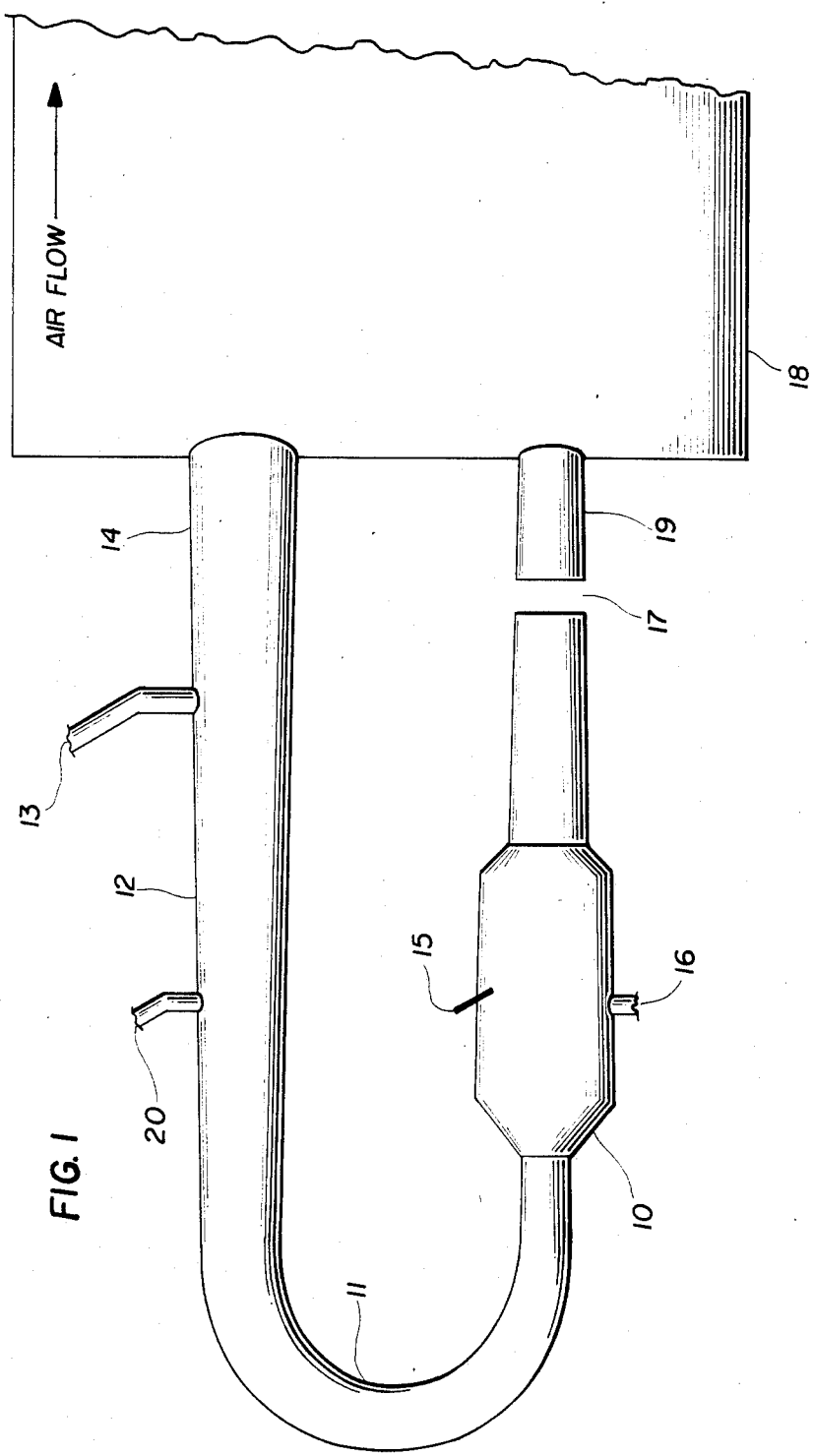

The starch bases useful herein are granular native and modified starches which may be derived from any plant source including corn, potato, sweet potato, wheat, rice, sago, tapioca, waxy corn (also referred to as waxy maize), sorghum, high amylose corn, or the like. The modified starches may include conversion products derived from any of the bases including, for example, dextrins prepared by the hydrolytic action of acid and/or heat; oxidized starches prepared by treatment with oxidants such as sodium hypochlorite; fluidity or thin boiling starches prepared by enzyme conversion or mild acid conversion; derivatized starches such as starch ethers and esters; and crosslinked starches. The starches may be modified in several ways, e.g., by conversion and derivatization, by crosslinking and derivatization and the like.

The operation of the pulse combustion engine is described in the Brief Description of the Drawings. The cyclical pattern of detonations, which occur at about 250 times per second, provide a high energy, broadband, accoustic wave front. This sonic energy causes rapid, efficient dispersion of the feed particles. The sonic waves are thought to "vibrate" each feed particle, facilitating heat and mass transfer. Although the hot jet gases can reach 1371° C. (2500° F.) in in temperature, residence time in this turbulent zone is very short, only several milliseconds, so that the actual system temperature of the feed particles is much lower—about (149° C.-300° F.) maximum. It is the combination of high thermal and sonic energy which disrupts the feed particles, maximizes surface area, encourages efficient heat transfer, and, thus, provides the physical environment for simultaneously pregelatinizing and drying the starch in the feed.

The pulse combustion apparatus which is used herein is conventional and described in U.S. Pat. No. 4,226,668 issued Oct. 7, 1980 to F. A. Ferguson, the disclosure of which is incorporated herein by reference. Commercial pulse combustion apparatuses are also described in "Pulse Combustion Lowers Drying Costs" (Chemical Engineering, Dec. 10, 1984 pp. 44–45).

The above apparatus and like apparatuses utilizing hot air gases from pulse jet engines have been used to dehydrate and/or concentrate various food and agricultural products, including artichokes, brewer's grain, coffee grounds, instant dairy whey, lactose, potato waste, rice, shrimp meal, single-cell protein, soy protein, and starch. See, e.g., U.S. Pat. No. 3,485,487 (issued Dec. 23, 1969 to E. L. Bennett et al.) which describes the concentration of low-grade, iron-bearing ores by supplying a fluidized ore periodically into the exhaust pipe of a pulse jet engine; U.S. Pat. No. 3,586,515 (issued June 22, 1971 to E. E. Anderson) where whole fish is converted to fish meal and oil by grinding the fish to form a slurry, flash heating the ground fish to a temperature under its boiling point, holding the slurry for a time, centrifugally separating the slurry into a solid phase and a liquid phase, centrifugally separating the liquid phase into oil and a liquid residue, removing the oil, combining the liquid residue with the solid phase, and drying the combined material with a pulse jet engine to form fish meal particles; and U.S. Pat. No. 4,334,366 (issued June 15, 1982 to R. M. Lockwood) which supplies the sonic energy and hot pulsating gas from a pulse jet engine to a perforated drum which serves as a drying chamber into which moist particles such as food are loaded. None of the above patents suggests simultaneously cooking (i.e., gelatinizing) and drying a starch product in situ in the hot pulsating gas, with such cooking resulting in changes in the physical and colloidal properties.

The following examples, which describe the preparation of pregelatinized dispersible starches, more fully illustrate the embodiments of this invention. In the examples, all parts and percentages are given by weight, and all temperatures are in degrees Celsius unless otherwise noted. The Brabender viscosity of the various starches was determined while mixing a water suspension of the starch and gradually heating it from 30° C. to 52° C. at 1.5° C. per min.; there is an "initial" hold at 30° C. for 10 min. This determination illustrates the swelling properties of the precooked starches since 52° C. is at least 20° C. below the gelatinization temperature of the waxy maize starch used in the following examples.

EXAMPLE 1

This example describes the preparation of three cold-water swelling (CWS) waxy maize starch samples (A, B, and C) using a high-solids feed.

The feed was prepared by mixing 227 kg. (500 lbs.) of waxy maize starch and 85 l. (22.5 gal.) of water in a cylindrical rotating mixer and putting the resulting mixture through a Hammer Mill running at about 2000 RPM which is equipped with a coarse-screen. The moistened starch granules analyzed at 65% solids. A 10 cm. (4 in.) screw conveyor with a small hopper feed opening was used to transfer the moistened starch granules to the inlet nozzle on the pulse jet. The feed inlet nozzle was located on top of and about 46 cm. (18 in.) from the end of the "U" shaped pipe section before it enters the collection chamber carrying the hot exhaust gases. The gases were introduced to the collection system through a conical diffuser section at the end of the engine and projecting into the primary collector.

With Sample A, a water spray nozzle (rated at 0.6 gallons/min.), which was located on the same circumference as the feed nozzle and at a 45° angle to it (not as shown in FIG. 2), was used for cooling. The pulse jet was started; after about 30 sec. the water spray was turned on; and then the moist starch was conveyed into the inlet nozzle at a rate estimated to be about 626 kg./hr. (1380 lbs./hr.). The air temperature measured at the discharge end of the collector was about 163° C. (325° F.). The run progressed smoothly and after about 15 min. the system was shut down. The collector walls were relatively clean with very little cooked starch paste on the walls. The diffuser cone projecting from the engines showed a small amount of some dark scorched starch. Evaluation of the resultant starch powder showed it had a moisture content of 1.9%, pH of about 5, and bulk density of about 341.2 kg./m.$^3$ (21.3 lb./ft.$^3$). Only 10% of the birefringent polarization crosses remained, indicating the starch was about 90% gelatinized. It is difficult to prepare CWS waxy maize starches which do not lump or "clot" when dispersed in water. Typically, the cooked starch hydrates rapidly, a gelatinous film forms on the surface, and further water cannot penetrate the film. The powder from Sample A was easily dispersed in cold water and the paste was smooth with a short texture.

With Sample B, the starch-water mixture (65% solids) was fed to the engine at a somewhat higher rate, estimated to be about 680 kg./hr. (1500 lb./hr.). The flow to the water spray nozzle was decreased to 0.3 GPM, providing higher solids at the entry point to the engine exhaust pipe. The run was shortened to about 2 min. because of mechanical problems and the air temperature at the discharge end of the collection chamber had risen to only about 135° C. (275° F.). The product had a moisture content of 4%, pH of 6.3, and bulk density of about 424.5 kg./m.$^3$ (26.5 lbs./ft.$^3$). Only about 6% of the polarization crosses remained, indicating about 94% gelatinization. The viscosity pattern of the sample (see Table I) showed slightly lower viscosities, especially at 52° C., than Sample A.

With Sample C, the starch-water mixture, (35% moisture) was fed to the engine at a somewhat lower rate, estimated to be at about 567 kg./ hr. (1250 lbs./hr.). Water was delivered at the spray nozzle at 0.3 GPM. The run progressed smoothly for 6 minutes when the feed mixture was exhausted. The air temperature at the discharge of the collection chamber leveled off at 160° C. (320° F.). The chamber was relatively clean and essentially free of any deposits of pasted or dried starch. There was some charring on the diffuser as it entered the collector, and this probably accounted for the light tan off-color of the product. The product had a moisture content of 2.4%, pH of 5.2, and bulk density of about 368.5 kg./m.$^3$ (23 lbs./ft.$^3$). Only about 6% of the polarization crosses remained, indicating about 94% gelatinization. The viscosity pattern of this sample (see Table I) was the same as that of Sample A but the viscosity was slightly lower. The intrinsic viscosity could be considered slightly low. This may have resulted from the lower feed rate which provided more energy per unit processed.

The Brabender viscosity patterns of the above pulse jet-cooked starches were compared with those of pre-cooked waxy maize starches prepared by other pregelatinization methods. The results are shown below.

TABLE I

| Pregelatinized Starch Sample | Brabender Viscosity (B.U.) 8% Solids, pH 5.5 | | | Intrinsic Viscosity (dl./g.) |
|---|---|---|---|---|
| | 10 min. at 30° C. | 45° C. | 52° C. | |
| Pulse Jet | | | | |
| A | 650 | 640 | 660 | 0.92 |
| B | 510 | 450 | 430 | 1.00 |
| C | 580 | 550 | 550 | 0.86 |
| (all processed at 65% solids/ 35% moisture) | | | | |
| Drum Dried (at 40% solids/ 60% moisture) | 1140 | 590 | 400 | 1.15 |
| Extruded (at 80% solids/ 20% moisture) | 90 | 60 | 55 | 0.88 |
| Jet cooked at 138° C. (280° F.) and spray dried (at 5% solids/ 95% moisture) | 120 | 110 | 110 | 1.13 |

The pulse jet cooked products were stable in viscosity during the entire heating time, with the samples' viscosities ranging from about 500–600 B.U. (1 Brabender unit is approximately 1 cps) at 8% solids. These viscosities were substantially higher than the viscosities of the extruded and jet-cooked/spray-dried starch samples. The drum-dried starch was higher in initial viscosity, but it then broke down so that the final viscosity was lower than that of the pulse jet engine cooked products. Thus, the jet engine products were superior in viscometric properties to precooked starches prepared by the other pregelatinization methods. The products showed a high final viscosity with no significant breakdown from the initial viscosity to the final viscosity, a viscosity profile that provides significant textural advantage. The only apparent disadvantage, for some applications, was the light tannish off-color that the engine products had.

The intrinsic viscosity (I.V.) of the samples is an indication of the molecular weight of starch. The jet engine products were slightly lower in I.V. than the drum-dried or jet cooked/spray-dried samples (0.86–1.00 vs. 1.15–1.13, respectively); they were the same as, or higher than, the extruded product (0.88). The similarity of the I.V.'s indicates that there are no significant differences in the molecular scission or degradation brought about by the various methods of pregelatinizing the starch. Rather, it is the granular organization, i.e., crystallinity, which is markedly affected by the pregelatinization method selected. The jet engine products show a distinct advantage as indicated by their viscosity profiles.

EXAMPLE 2

The feed was changed from the moist, cake-like feed of Example 1 (65% solids) to a fluid, free flowing slurry of granular waxy maize starch suspended in water (36% solids). The feed injection nozzle to the engine exhaust was located in the same position as when used for the moist "cake" feeds of Example 1. However, there were no water sprays into the engine gases and the diffuser section was jacketed and water cooled. A run was made at a feed rate of about 1361 kg./ hr. (3000 lbs./hr.) of slurry. The air temperature at the discharge end of the collector stabilized at 129° C. (265° F.) over 6 minutes. The granules retained about 70% of their polarization crosses indicating about 30% gelatinization, which was considerably lower than with the high solids cakes. The product had a moisture content of 4.6%, pH of 5.9, and 688.9 kg./m.$^3$ bulk density of (43 lbs./ft.$^3$). The color was much lighter than products of Example 1. Although gelatinization was demonstrated, it is clear that better control of the operating parameters (i.e., better atomization, longer residence time, and/or better temperature control) is needed to achieve higher levels of gelatinization.

EXAMPLE 3

Two of the jet engine starch products of Example 1 (Samples A and C) were tested as fluid loss control agents for an oil well drilling mud - an important application for pregelatinized starches. It was compared to an extruded waxy maize starch, a product known to be an effective fluid loss control agent and a commercial control. The standard API procedure was used (4% sodium chloride or calcium chloride, 3 lbs. per bbl. at room temperature). The results are shown in Table II.

TABLE II

| Sample | Fluid Loss (cc.) | |
|---|---|---|
| | 4% NaCl | 4% CaCl$_2$ |
| Pulse Jet Waxy Starch Sample A | 14 | 15 |
| Pulse Jet Waxy Starch Sample C | 15 | 17 |
| Extruded Waxy Starch | 24 | 43 |
| Commercial Control* | 11 | 17 |

*Mil-Starch - a pregelatinized starch available from Milchem Co., Houston, Texas.

The pulse jet engine product showed excellent fluid loss control; it was superior to the same base starch pregelatinized by extrusion. These starches should be excellent in a wide range of such applications, even the more demanding applications involving calcium chloride.

EXAMPLE 4

One of the jet engine starch products of Example 1 (Sample C) was evaluated in an instant chocolate pudding and compared to a drum dried waxy starch sample and a commercial starch product (a derivatized starch used extensively for instant puddings). The jet engine starch gave a pudding with better surface smoothness and gloss than either of the other starches. It had a softer texture and did not show as good a "cut" as the commercial pudding. However, the surface properties, texture, and "cut" were better than the drum dried sample, thus suggesting that modification of the base starch is as important in preparing instant starches for puddings as the method of pregelatinization.

Summarizing, this invention provides an efficient and convenient process for the preparation of dispersible starches.

Now that the preferred embodiments of the present invention are described in detail, various modifications and improvements thereon, will become readily apparent to those skilled in the art. Accordingly, the spirit and scope of the invention are to be limited by the appended claims, and not by the foregoing specification.

What is claimed is:

1. A process for simultaneously atomizing, pregelatinizing, and drying a moist starch cake to produce a pregelatinized starch powder, which consists essentially of the steps of:
   (a) preparing the moist starch cake comprising up to about 75% by weight of a granular starch and water;
   (b) feeding the starch cake into an exhaust pipe containing a hot exhaust gas stream from a sonic pulse jet combustion engine to atomize the starch cake;
   (c) maintaining the resulting mixture of atomized starch, water, and hot gas in the exhaust pipe for a time sufficient to pregelatinize, and substantially dry the atomized starch; and
   (d) recovering the pregelatinized starch powder by exhausting the mixture containing the atomized, pregelatinized and substantially dry starch powder into a collection chamber supplied with a flow of air.

2. The method of claim 1, wherein the solids content of the starch cake is about 55 to 75% by weight.

3. The method of claim 1, wherein the granular starch is selected from the group consisting of an unmodified or modified corn, waxy corn, high amylose corn, potato, sweet potato, rice, and tapioca starch.

4. The method of claim 3, wherein the starch is the unmodified starch.

5. The method of claim 1, wherein the starch is the modified starch selected from the group consisting of an acid-converted starch, oxidized starch, derivatized starch, and crosslinked starch.

6. The method of claim 4, wherein the starch is a waxy maize starch.

7. A process for simultaneously atomizing, pregelatinizing, and drying a starch slurry to produce a pregelatinized starch powder, which consists essentially of the steps of:
   (a) preparing the starch slurry comprising up to about 43% by weight of a granular starch and water;
   (b) feeding the starch slurry into an exhaust pipe containing a hot exhaust gas stream from a sonic pulse jet combustion engine to atomize the starch mixture;
   (c) maintaining the resulting mixture of atomized starch, water, and hot gas in the exhaust pipe for a time sufficient to pregelatinize and substantially dry the atomized starch; and
   (d) recovering the pregelatinized starch powder by exhausting the mixture containing the atomized, pregelatinized and substantially dry starch powder into a collection chamber supplied with a flow of air.

8. The method of claim 7, wherein the solids content of the slurry is about 10 to 43% by weight.

9. A process for simultaneously atomizing, pregelatinizing, and drying a mixture of starch and water to produce a pregelatinized starch powder, which consists essentially of the steps of:
(a) preparing a mixture of a granular starch and up to about 25% by weight of water;
(b) feeding the starch-water mixture into an exhaust pipe containing a hot exhaust gas stream from a sonic pulse jet combuston engine to atomize the starch mixture;
(c) maintaining the resulting mixture of atomized starch, water, and hot gas in the exhaust pipe for a time sufficient to pregelatinize and substantially dry the atomized starch; and
(d) recovering the pregelatinized starch powder by exhausting the mixture containing the atomized, pregelatinized and substantially dry starch powder into a collection chamber supplied with a flow air.

* * * * *